(12) United States Patent
Doherty et al.

(10) Patent No.: US 11,280,616 B2
(45) Date of Patent: Mar. 22, 2022

(54) OPERATING STATUS IDENTIFICATION SYSTEM FOR MACHINE

(71) Applicant: Caterpillar Inc., Deerfield, IL (US)

(72) Inventors: Thomas Frank Doherty, Brisbane (AU); Darryl Victor Collins, Jindalee (AU); Michael Siemer, Corinda (AU)

(73) Assignee: Caterpillar Inc., Peoria, IL (US)

(*) Notice: Subject to any disclaimer, the term of this patent is extended or adjusted under 35 U.S.C. 154(b) by 258 days.

(21) Appl. No.: 16/508,499

(22) Filed: Jul. 11, 2019

(65) Prior Publication Data

US 2019/0331494 A1 Oct. 31, 2019

(51) Int. Cl.
*G01C 21/16* (2006.01)
*G01S 19/47* (2010.01)
*G01S 19/14* (2010.01)

(52) U.S. Cl.
CPC ............ *G01C 21/165* (2013.01); *G01S 19/14* (2013.01); *G01S 19/47* (2013.01)

(58) Field of Classification Search
CPC ....... G01C 21/165; G01C 21/16; G01S 19/14; G01S 19/47; G01S 19/49
See application file for complete search history.

(56) References Cited

U.S. PATENT DOCUMENTS

| | | | |
|---|---|---|---|
| 6,480,152 B2 | 11/2002 | Lin et al. | |
| 8,275,193 B2 | 9/2012 | Lin | |
| 9,709,391 B2 | 7/2017 | Bando et al. | |
| 9,945,100 B2 | 4/2018 | Friend | |
| 2012/0283920 A1* | 11/2012 | Kim | B62D 55/116 701/50 |
| 2016/0305094 A1 | 10/2016 | Chang | |
| 2018/0215393 A1 | 8/2018 | Miyakubo et al. | |
| 2019/0331494 A1 | 10/2019 | Doherty et al. | |

FOREIGN PATENT DOCUMENTS

| | | |
|---|---|---|
| CN | 106568430 | 4/2017 |
| JP | 2005138751 A | 6/2005 |
| KR | 20140061019 A | 5/2014 |
| KR | 20150066855 A | 6/2015 |
| WO | 2016027830 | 2/2016 |
| WO | 2016047166 | 3/2016 |

* cited by examiner

*Primary Examiner* — Brian P Sweeney
(74) *Attorney, Agent, or Firm* — Xsensus LLC

(57) ABSTRACT

An operating status identification system for a machine includes a position sensing module configured to generate a first signal value corresponding to a speed of the machine. The operating status identification system also includes a motion sensing module configured to generate a second signal value corresponding to at least one motion parameter of the machine. The operating status identification system further includes a control module communicably coupled to each of the position sensing module and the motion sensing module. The control module is configured to receive the first signal value and the second signal value. The control module is further configured to identify whether the machine is in at least one of an operating state and a non-operating state based on a combination of the first and second signal values. The control module is configured to identify that the machine is in the operating state when the machine is stationary.

18 Claims, 2 Drawing Sheets

OPERATING STATUS IDENTIFICATION SYSTEM FOR MACHINE

TECHNICAL FIELD

The present disclosure relates to a system for identifying an operating status of a machine.

BACKGROUND

Machine, such as a construction machine, operating at a worksite typically includes an implement that is used to perform one or more work operations at the worksite. The machine may perform work operations whilst remaining at the same spatial position. For example, the machine may perform work operations while it is stationary or when a speed of the machine is low. Conventionally, Global Positioning System (GPS) data is used for locating, tracking, positioning, and limiting a movement of the machine and/or the implement of the machine.

However, the low accuracy GPS data may not provide an accurate determination of an operating time and an idle time of the machine. More particularly, when the machine includes a GPS antenna located near a center of rotation of the machine, the speed of the machine may remain very low while the machine is performing a certain work operation. Systems that are currently used to determine the operating time and the idle time of the machine using signals from the GPS antenna tend to classify the machine as idle even though the machine is performing useful work. Thus, such systems may generate incorrect reports corresponding to the operating time and the idle time of the machine, which may in turn result in incorrect determination of machine use and availability.

U.S. Pat. No. 8,275,193 describes a miniaturized GPS/MEMS IMU integrated navigation system. A miniaturized GPS/MEMS integrated navigation system is presented; Laser Dynamic Range Imager (LDRI) based alignment algorithm for space applications is discussed. Two navigation cameras are also included to measure the range and range rate which can be integrated into the GPS/MEMS IMU system to enhance the navigation solution.

SUMMARY OF THE DISCLOSURE

In an aspect of the present disclosure, an operating status identification system for a machine is provided. The operating status identification system includes a position sensing module mounted on the machine. The position sensing module is configured to generate a first signal value corresponding to a speed of the machine. The operating status identification system also includes a motion sensing module mounted on the machine. The motion sensing modulo is configured to generate a second signal value corresponding to at least one motion parameter of the machine. The operating status identification system further includes a control module communicably coupled to each of the position sensing module and the motion sensing module. The control module is configured to receive the first signal value corresponding to the speed of the machine from the position sensing module. The control module is also configured to receive the second signal value corresponding to the at least one motion parameter of the machine from the motion sensing module. The control module is further configured to identify whether the machine is in at least one of an operating state and a non-operating state based on a combination of the first and second signal values received by the control module. The control module is configured to identify that the machine is in the operating state when the machine is stationary.

Other features and aspects of this disclosure will be apparent from the following description and the accompanying drawings.

DETAILED DESCRIPTION

Figure 1:
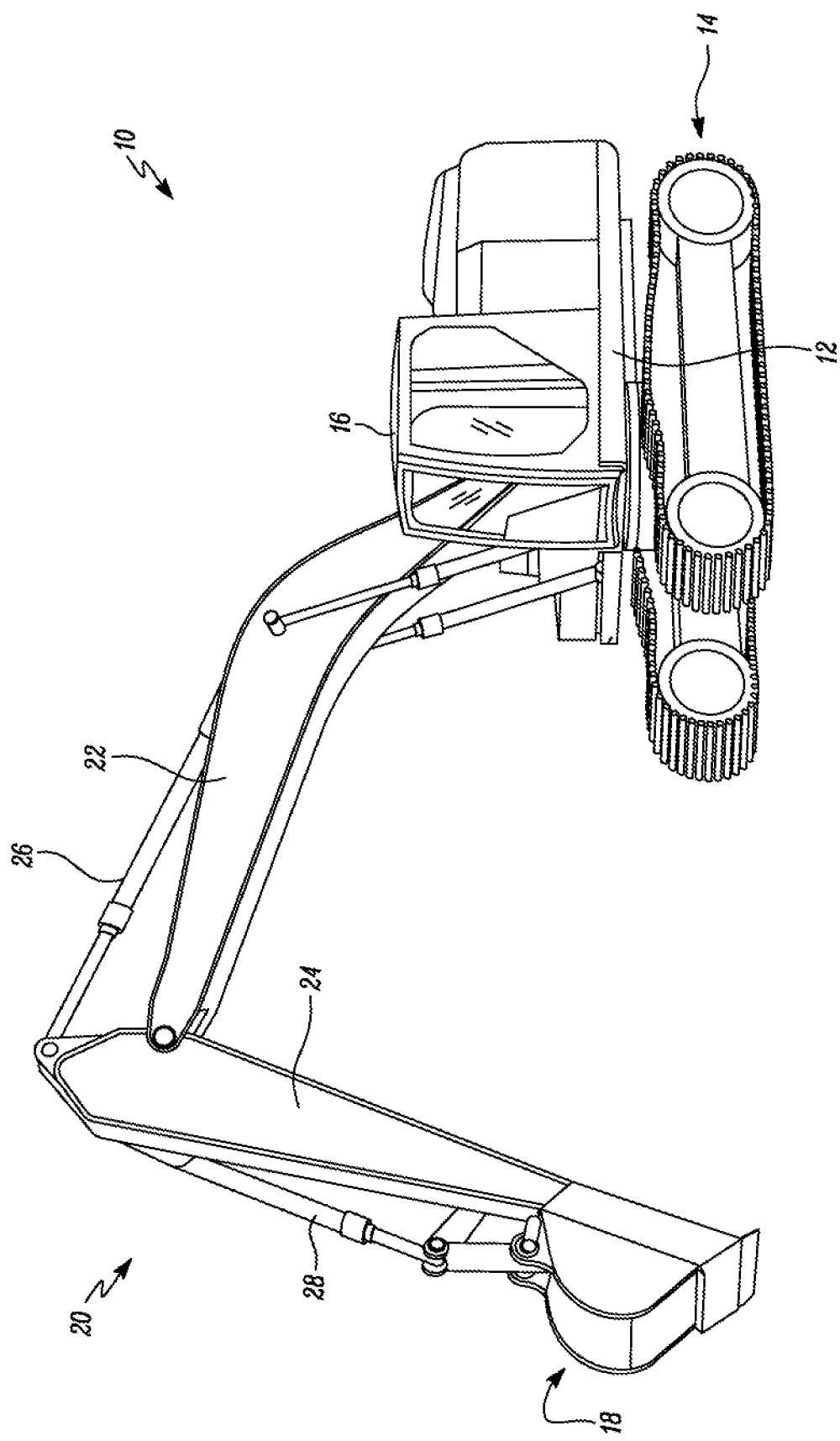
FIG. 1 is a perspective view of an exemplary machine, in accordance with an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

FIG. 1 illustrates an exemplary machine 10. The machine 10 is embodied as an excavator. It should be noted that the machine 10 may include other machines such as a drill, a backhoe loader, a shovel, or any other construction machines that are known in the art, and more specifically machines that make use of an implement 18. As illustrated, the machine 10 includes a frame 12 that is rotatable mounted on tracks 14. The tracks 14 are used for movement of the machine 10 at a worksite.

Further, the machine 10 includes an operator cab 16. The operator cab 16 is disposed on the frame 12. When the machine 10 is embodied as a manual machine or a semi-autonomous machine, an operator of the machine 10 may be seated within the operator cab 16 to operate the machine 10. Further, the operator cab 16 may include one or more input devices 40 (shown in FIG. 2) that allow the operator to drive the machine 10 at the worksite or to perform one or more work operations using an implement 18 of the machine 10. The input devices 40 may include any one of a joystick, a lever, a button, and the like.

Further, the machine 10 includes the implement 18. The implement 18 is embodied as a bucket. Alternatively, the implement 18 may be a ripper, a hammer, a bucket of another size, a drill, a shovel, a crusher, a shear, or any other known implement or tool for the machine 10. The implement 18 forms a part of a linkage assembly 20. The implement 18 is connected to the frame 12 by a boom 22 and a stick 24. The boom 22 and the stick 24 form a part of the linkage assembly 20. The linkage assembly 20 further includes a pair of hydraulic cylinders 26, 28 that allow movement of the implement 18 with respect to the frame 12 of the machine 10. Further, a sensing module 38 (shown in FIG. 2) may be associated with the linkage assembly 20. The sensing module 38 may include a number of sensors, such as position sensors or angle sensors, that assist in determination of a position of the boom 22, the stick 24, the implement 18, and/or the hydraulic cylinders 26, 28.

Figure 2:
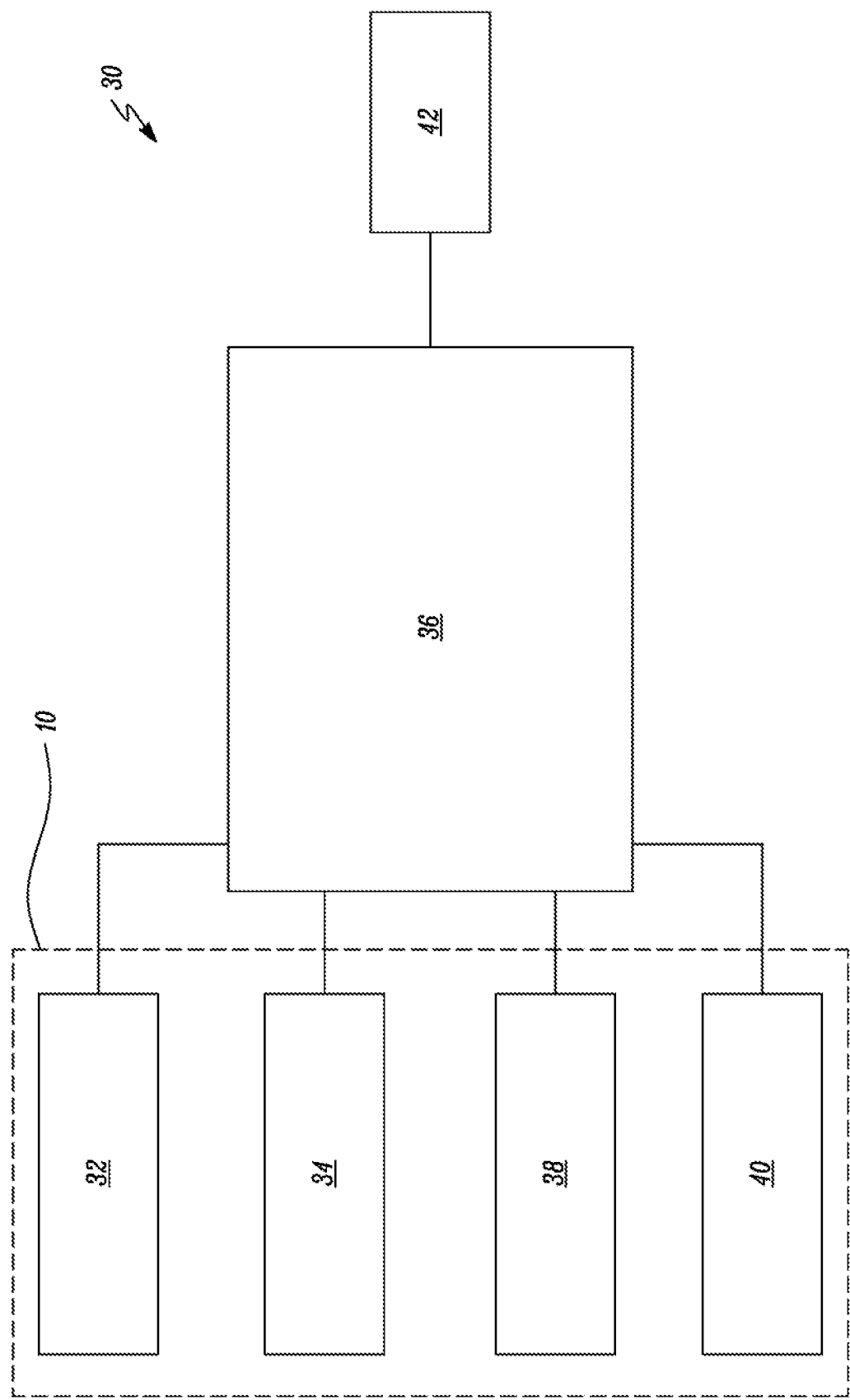
FIG. 2 is a block diagram of an operating status identification system associated with the machine of FIG. 1, in accordance with an embodiment of the present disclosure.

Referring to FIG. 2, in order to identify an operating status of the machine 10, an operating status identification system 30 is associated with the machine 10. More particularly, the system 30 is used for identifying when the machine 10 is in operation and when the machine 10 is idle. The system 30 is used to determine availability of the machine 10 and to identify an operating time and a non-operating time of the machine 10. The operating status identification system 30 is hereinafter interchangeably referred to as the system 30. The system 30 includes a position sensing module 32 mounted on the machine 10. In an example, the position sensing module 32 is disposed on the operator cab 16 (see FIG. 1) of the machine 10. In another example, the position sensing module 32 may be disposed on any component of the machine 10, such as the implement 18 (see FIG. 1). The position sensing module 32 generates a first signal value corresponding to a speed of the machine 10. In the illustrated example, the position sensing module 32 includes a Global Positioning System (GPS) module.

Further, the system 30 includes a motion sensing module 34 mounted on the machine 10. In an example, the motion sensing module 34 is disposed on the operator cab 16 of the machine 10. In another example, the motion sensing module 34 may be disposed on any component of the machine 10, such as the implement 18. The motion sensing module 34 generates a second signal value corresponding to one or more motion parameters of the machine 10. The one or more motion parameters may include a rotational rate of the machine 10 and an acceleration rate of the machine 10. In the illustrated example, the motion sensing module 34 includes an Inertial Measurement Unit (IMU). Accordingly, the motion sensing module 34 may generate 3-axis rotational and acceleration rates of the machine 10. The motion sensing module 34 may include a combination of sensors, such as an accelerometer, a gyroscope, and the like.

The system 30 also includes a control module 36. The control module 36 is communicably coupled to each of the position sensing module 32 and the motion sensing module 34. In an example, the control module 36 may be disposed on the machine 10. Alternatively, the control module 36 may be disposed at a remote location, such as a base station. The control module 36 receives the first signal value corresponding to the speed of the machine 10 from the position sensing module 32. Further, the control module 36 receives the second signal value corresponding to one or more motion parameters of the machine 10 from the motion sensing module 34.

Moreover, the control module 36 identifies whether the machine 10 is in the operating state or the non-operating state based on a combination of the first and second signal values received by the control module 36. More particularly, the control module 36 identifies whether the machine 10 is stationary or in motion based on the first signal value received from the position sensing module 32. For example, if the first signal value corresponding to the speed of the machine 10 is zero or approximately equal to zero, the control module 36 identifies that the machine 10 is stationary.

Further, the control module 36 monitors the second signal value received from the motion sensing module 34. More particularly, the control module 36 compares the second signal value received from the motion sensing module 34 with a predetermined threshold value. The predetermined threshold value may correspond to measurements of the rotational and/or acceleration rates of the machine 10, such that any signal value that is greater than the predetermined threshold value may indicate that the machine 10 is in the operating state.

In some examples, the control module 36 may identify the operating status of the machine 10 based on the second signal values indicative of any one of the rotational and acceleration rates of the machine 10. For example, the control module 36 may receive the second signal value indicating the rotational rate of the machine 10. Further, if the second signal value indicating the rotational rate of the machine 10 is lesser than the predetermined threshold value corresponding to the rotational rate of the machine 10 and the first signal value is zero or approximately equal to zero, the control module 36 identifies that the machine 10 is in the non-operating state. However, if the second signal value indicating the rotational rate of the machine 10 is greater than the predetermined threshold value corresponding to the rotational rate of the machine 10 and the first signal value is zero or approximately equal to zero, the control module 36 identifies that the machine 10 is in the operating state. Thus, the control module 36 identifies that the machine 10 is in the operating state when the machine 10 is stationary.

In another example, the control module 36 may receive the second signal value indicating the acceleration rate of the machine 10. Further, if the second signal value indicating the acceleration rate of the machine 10 is lesser than the predetermined threshold value corresponding to the acceleration rate of the machine 10 and the first signal value is zero or approximately equal to zero, the control module 36 identifies that the machine 10 is in the non-operating state. However, if the second signal value indicating the acceleration rate of the machine 10 is greater than the predetermined threshold value corresponding to the acceleration rate of the machine 10 and the first signal value is zero or approximately equal to zero, the control module 36 identifies that the machine 10 is in the operating state. Thus, the control module 36 identifies that the machine 10 is in the operating state when the machine 10 is stationary. In other examples, the control module 36 may use the second signal values corresponding to each of the rotational and acceleration rates of the machine 10 to identify the operating status of the machine 10.

In some examples, the control module 36 may be communicably coupled to the sensing module 38. More particularly, the control module 36 may receive signal values corresponding to the position of the boom 22, the stick 24, the implement 18, and/or the hydraulic cylinders 26, 28. Based on the signal values received from the sensing module 38, the control module 36 may identify if the implement 18 is performing a particular work operation. The first and second signal values received from the position and motion sensing modules 32, 34 may be combined with the signal values received from the sensing module 38 to identify if the machine 10 is operating or not operating.

In another example, the control module 36 may be communicably coupled to a sensor (not shown) associated with the input device 40 that is used to operate the implement 18. In an example, the control module 36 may receive signal values corresponding to a position of the input device 40 from the sensor. More particularly, when the operator uses the input device 40 to control the implement 18 for performing one or more work operations, the control module 36 may receive information regarding any changes in the position of the input device 40 from the sensor. Thus, the control module 36 may identify if the implement 18 is performing a particular work operation based on the signal values received from the sensor. The first and second signal values received from the position and motion sensing modules 32, 34 may be combined with the signal values received from the sensor associated with the input device 40 to identify if the machine 10 is operating or not operating.

Further, the system 30 includes an output device 42. In some examples, the control module 36 may be communicably coupled to the output device 42. The control module 36 may transmit data corresponding to a current operating status of the machine 10, an operating time of the machine 10, and/or a non-operating time of the machine 10 to the output device 42. Accordingly, the output device 42 may display information corresponding to the operating and/or non-operating time of the machine 10. Further, the output device 42 may also display information regarding the current operating status of the machine 10 to notify a personnel regarding the current operating status of the machine 10. In an example, the output device 42 may be present at the base station.

The output device 42 may embody a display device such as a monitor, a handheld/portable device such as a tablet or a smartphone, or any other known device having a screen that provides visual output. In such an example, the output device 42 may display a visual notification, such as a text message, to notify the operator regarding the operating and non-operating time of the machine 10 and/or the current operating status of the machine 10. Alternatively, the output device 42 may include speakers that provide audio output. In such an example, the notification may include an audio notification to notify the operator, without any limitations.

Further, the control module 36 may embody a single microprocessor or multiple microprocessors that include components for performing functions that are consistent with the present disclosure. Numerous commercially available microprocessors can be configured to perform the functions of the control module 36 disclosed herein. It should be appreciated that the control modulo 36 could readily be embodied in a general machine microprocessor capable of controlling numerous machine functions. The control module 36 may also include a memory and any other components for running an application. Various circuits may be associated with the control module 36 such as power supply circuitry, signal conditioning circuitry, solenoid driver circuitry, and other types of circuitry. Also, various routines, algorithms, and/or programs can be stored at the control module 36 for identifying the operating status of the machine 10.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the operating status identification system 30 that is used to identify if the machine 10 is in the operating state or the non-operating state. The system 30 described herein is simple in operation and provides a cost effective solution as the system 30 uses components that are already associated with the machine 10. More particularly, the system 30 uses sensors that are already mounted on the machine 10, such as the GPS module and the IMU, to identify if the machine 10 is operating or not operating.

Further, the system 30 accurately identifies if the machine 10 is performing one or more work operations even when the machine 10 is stationary from a spatial perspective. Thus, the system 30 provides an accurate data of an overall operating and idle time of the machine 10. Moreover, the system 30 allows automated creation of data corresponding to operating anchor non-operating hours of the machine 10, which can be further used in data fusion for determining machine efficiency. Thus, the system 30 may be used in connection with other systems for reporting operating efficiency/site management. Further, the system 30 may be combined with data from received from other sensors, such as the sensing module 38, the sensor associated with the input device 40, etc. for an accurate and precise identification of the operating status of the machine 10.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. An operating status identification system for a machine comprises:
    a position sensor mounted on the machine at a first position, wherein the position sensor is configured to generate a first signal value corresponding to a speed of the machine;
    a motion sensor, different from the position sensor, mounted on the machine at a second position different from the first position, wherein the motion sensor is configured to generate a second signal value corresponding to at least one motion parameter of the machine, the at least one motion parameter including a rotational rate of the machine and an acceleration rate of the machine; and
    a controller communicably coupled to each of the position sensor and the motion sensor, wherein the controller is configured to:
        receive the first signal value corresponding to the speed of the machine from the position sensor;
        receive the second signal value corresponding to the at least one motion parameter of the machine, which includes the rotational rate of the machine and the acceleration rate of the machine, from the motion sensor; and
        identify whether the machine, as a whole, is in at least one of an operating state and a non-operating state based on a combination of the first and second signal values received by the controller,
    wherein the controller is configured to identify that the machine, as a whole, is in the operating state when the machine is stationary based on the combination of the first and second signal values received by the controller.

2. The operating status identification system according to claim 1, wherein the rotational rate of the machine and the acceleration rate of the machine are 3-axis rotational and acceleration rates.

3. The operating status identification system according to claim 1, wherein the position sensor is mounted on a cab of the machine and the motion sensor is mounted on an implement of the machine.

4. The operating status identification system according to claim 1, wherein the motion sensor includes an accelerometer and a gyroscope.

5. The operating status identification system according to claim 1, wherein the controller is disposed remote from the machine.

6. The operating status identification system according to claim 1, wherein the controller identifies whether the machine is in the operating state or the non-operating state by comparing the first signal value to a predetermined speed threshold and by comparing the second signal value to a predetermined motion threshold.

7. The operating status identification system according to claim 6, wherein the controller determines that the machine is in the non-operating state when the second signal value is below the predetermined motion threshold and the first signal value is zero.

8. The operating status identification system according to claim 6, wherein the controller determines that the machine is in the operating state when the second signal value is greater than the predetermined motion threshold and the first signal value is zero.

9. The operating status identification system according to claim 1, further comprising a sensor, different from the position sensor and the motion sensor, configured to sense position of an implement of the machine and generate a third signal value corresponding to position of the implement,
wherein the controller is configured to receive the third signal value and identify whether the machine, as a whole, is in at least one of the operating state and the non-operating state based on a combination of the third signal value with the combination of the first and second signal values.

10. The operating status identification system according to claim 1, further comprising a sensor, different from the position sensor and the motion sensor, configured to sense position of an input device to operate an implement of the machine and generate a third signal value corresponding to position of the input device,
wherein the controller is configured to receive the third signal value and identify whether the machine, as a whole, is in at least one of the operating state and the non-operating state based on a combination of the third signal value with the combination of the first and second signal values, and
wherein the input device includes a joystick.

11. The operating status identification system according to claim 1, further comprising a display device,
wherein the controller is configured to output, to the display device, current operating status information regarding whether the machine is currently in the operating state and the non-operating state, and
wherein the display device is configured to display a current operating status of the machine based on the received current operating status information from the controller.

12. A system for a machine comprising:
a position sensor mounted on the machine at a first position, wherein the position sensor is configured to sense a moving speed of the machine;
a motion sensor, different from the position sensor, mounted on the machine at a second position different from the first position, wherein the motion sensor is configured to sense at least one motion parameter of the machine, the at least one motion parameter including a rotational rate of the machine; and
control circuitry communicably coupled to each of the position sensor and the motion sensor, wherein the control circuitry is configured to:
identify whether the machine, as a whole, is in at least one of an operating state and a non-operating state based on both the moving speed of the machine as sensed by the position sensor and the at least one motion parameter including a rotational rate of the machine as sensed by the motion sensor,
wherein the control circuitry is configured to identify that the machine, as a whole, is in the operating state when the machine is stationary based on both the moving speed of the machine as sensed by the position sensor and the at least one motion parameter including a rotational rate of the machine as sensed by the motion sensor.

13. The system according to claim 12, wherein the rotational rate of the machine is 3-axis rotational rate.

14. The system according to claim 12, further comprising a sensor, different from the position sensor and the motion sensor, configured to sense position of an input device to operate the machine,
wherein the control circuitry is configured to identify whether the machine, as a whole, is in at least one of the operating state and the non-operating state based on all of the position of the input device as sensed by the sensor, the moving speed of the machine as sensed by the position sensor and the at least one motion parameter including a rotational rate of the machine as sensed by the motion sensor, and
wherein the input device is inside an operator cabin of the machine.

15. The system according to claim 12, further comprising a display device,
wherein the control circuitry is configured to determine an amount of time the machine has been in the operating state, and
wherein the display device is configured to display the amount of time the machine has been in the operating state based on the determination of the amount of time the machine has been in the operating state by the control circuitry.

16. A method comprising:
sensing, using a position sensor mounted on a machine at a first position, a moving speed of the machine;
sensing, using a motion sensor, different from the position sensor and mounted on the machine at a second position different from the first position, at least one motion parameter of the machine, the at least one motion parameter including a rotational rate of the machine and/or an acceleration rate of the machine;
sensing, using a sensor different from the position sensor and the motion sensor, a position of an input device to operate the machine; and
identifying, using a controller, whether the machine, as a whole, is in an operating state or a non-operating state based on all of the moving speed of the machine, the at least one motion parameter, and the position of the input device as sensed according to said sensing,
wherein said identifying identifies that the machine, as a whole, is in the operating state when the machine is stationary based on all of the moving speed of the machine, the at least one motion parameter, and the position of the input device as sensed according to said sensing.

17. The method according to claim 16, further comprising outputting, on a hand-held display device, a current operating status of the machine based on said identifying.

18. The method according to claim 16, wherein said identifying includes comparing each of the moving speed of the machine, the at least one motion parameter, and the position of the input device, as sensed according to said sensing, to respective threshold values.

* * * * *